United States Patent [19]
Hamilton

[11] Patent Number: 4,770,594
[45] Date of Patent: Sep. 13, 1988

[54] SOIL PLUG RELEASE APPARATUS

[75] Inventor: Thomas W. Hamilton, Stoke Poges, United Kingdom

[73] Assignee: T. W. Hamilton Design, Ltd., Burnham, United Kingdom

[21] Appl. No.: 876,262

[22] Filed: Jun. 19, 1986

[30] Foreign Application Priority Data

Jul. 5, 1985 [GB] United Kingdom ............. 8517153

[51] Int. Cl.⁴ ............... B65G 25/04; B65G 65/34
[52] U.S. Cl. ..................... 414/403; 47/73; 198/803.01; 198/744; 414/417
[58] Field of Search ............ 414/403, 416, 417; 198/803.01, 465.1, 744; 47/73

[56] References Cited

U.S. PATENT DOCUMENTS

| | | | |
|---|---|---|---|
| 2,271,937 | 2/1942 | Engels | 414/417 |
| 2,523,968 | 9/1950 | Paulson, Sr. | 198/744 |
| 3,272,361 | 9/1966 | Vogel et al. | 414/417 |
| 3,294,265 | 12/1966 | Roch et al. | 414/417 |
| 4,197,674 | 4/1980 | Blackmore, Jr. | 47/73 |
| 4,314,630 | 2/1982 | Greenwood, Jr. | 198/744 X |
| 4,476,973 | 10/1984 | Kessler et al. | 198/744 |

FOREIGN PATENT DOCUMENTS 7900943 8/1980 Netherlands ............... 47/73
1179807 2/1970 United Kingdom ............ 47/73

Primary Examiner—Kenneth J. Dorner
Assistant Examiner—Peter R. Brown
Attorney, Agent, or Firm—Christie, Parker & Hale

[57] ABSTRACT

Soil plug release apparatus is arranged to release plugs of soil from a tray of the type having an array of compartments arranged in rows and columns with each compartment having a hole in the base thereof. The apparatus has a pair of support members held in parallel spaced relationship, and a bridge member spanning the support members and having a curved upper surface, in which there is a row of spaced openings; the spacing between the openings corresponds to the spacing of the holes in a row of tray compartments. A pair of guides guide a tray between the support members transversely over the upper surface of the bridge. The guide means are such as to deform the underside of the tray to conform to the curvature of the bridge member at the point the tray passes over the bridge member. A plurality of cylinders each arranged to store a discrete bolus of air, are coupled one to each opening. The bolus of air is released from each cylinder when the holes in a row of compartments become aligned with the openings. This causes the plug of soil in each compartment to be ejected upwardly.

11 Claims, 4 Drawing Sheets

FIG. I.

SOIL PLUG RELEASE APPARATUS

BACKGROUND OF THE INVENTION

1. Field of the Invention

The present invention relates to soil plug release apparatus.

2. Description of the Prior Art

In the horticultural field seedlings are grown in compartmentalised trays generally of plastics material with one seedling per compartment.

In such trays the compartments are arranged in rows and columns and at the base of each compartment is a drainage hole to allow excess water to escape. When the tray is placed on a sand bed water can enter through the hole to supply the seedling.

When the seedlings have reached a desired size after weeks or months growing they need transplanting either directly into the open or into the larger seed trays or pots. Over a period of time as each seedling grows in the soil or potting compost, the soil or potting compost settles and becomes bound by the root growth of the seedling to form a solid plug which adheres to the walls of the compartment to a different extent in each compartment.

It has been previously proposed to loosen these plugs in their compartments prior to extraction for replanting. Once loosened the seedling can be grasped by the stem and removed from the tray without unduly stressing the plant. A particular scheme proposed comprises using a board bearing a plurality of pins laid out in rows and columns in an array which matches the array of drainage holes in the container. By locating the pins into the drainage holes and pushing them into the tray the soil plugs become loosened.

This arrangement has proved unsatisfactory for a number of reasons. Firstly the problem of accurately aligning all the pins with all the drainage holes simultaneously is not always easy. The tolerances to which the holes are produced in the seed tray are generally fairly wide and so it is not always possible to align the pins with the holes. Even where it is possible, each pin does not always loosen the plug it engages but sometimes tears the heart or centre out of the plug and so destroys the root system of the seedling. Also the pins become readily distorted and when this happens the deplugging operation cannot be performed satisfactorily.

It is an object of the invention to provide improved soil plug release apparatus.

SUMMARY OF THE INVENTION

According to the present invention there is provided soil plug release apparatus for releasing plugs of soil from an array of compartments arranged in rows and columns in a tray, each compartment having a hole in the base thereof, the apparatus comprising guide means for guiding the tray along a predetermined path, a line of openings extending transversely of said path with the openings being spaced at the same intervals as the holes in each row of compartments, means for displacing said tray along said path to bring each row of holes in turn into alignment with the line of openings, and means for discharging a metered quantity of fluid through each opening to release the plugs from the compartments corresponding to the aligned row of holes.

According to the present invention there is provided soil plug release apparatus for releasing plugs of soil from an array of compartments arranged in rows and columns in a tray, each compartment having a hole in the base thereof, the apparatus comprising: a pair of support members held in parallel spaced relationship, a bridge member spanning said support members and having a curved upper surface, the curvature being in a vertical plane, and the upper surface defining a row of spaced openings having axes which also lie in a common vertical plane, the spacing between the opening corresponding to the spacing of the holes in a row of tray compartments; guide means mounted on said support member, for guiding a said tray between the support member and transversely over the upper surface of the bridge, the guide means being so profiled as to deform the underside of the tray to conform to the curvature of the bridge member at the point the tray passes over the bridge member; a plurality of cylinders each arranged to store a discrete bolus of air; means coupling each cylinder to a corresponding said opening; means for sensing when a row of holes in a tray become aligned with the openings in the bridge member; means for releasing the bolus of air from each cylinder to corresponding openings in response to the sensing means sensing a said alignment; and means for recharging each cylinder with a bolus of air.

BRIEF DESCRIPTION OF THE DRAWINGS

Soil plug release apparatus embodying the invention will now be described by way of example with reference to the acccompanying drawings in which.

DESCRIPTION OF THE PREFERRED EMBODIMENT

Figure 1:
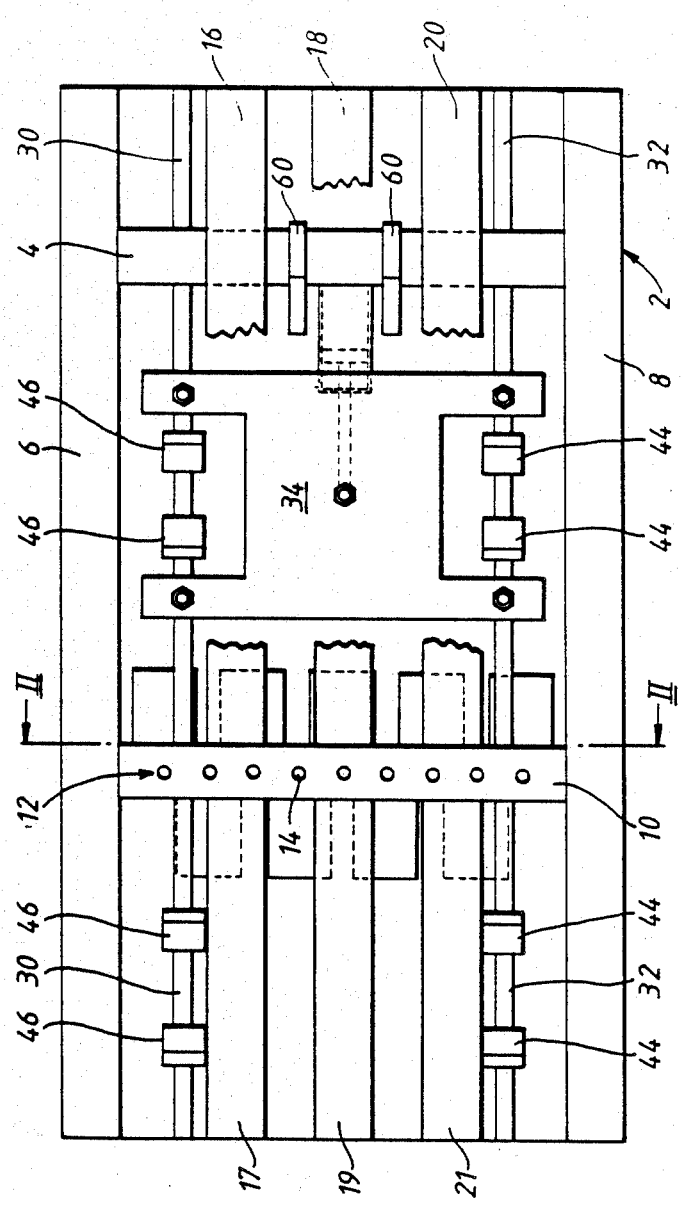
FIG. 1 is a part cut-away view of the apparatus with the shield plate omitted.

The apparatus shown in FIG. 1 comprises a frame 2 having a transverse support member 4 interconnecting two side walls 6 and 8 of the frame 2. A transverse air supply member 10 also interconnecting the walls 6 and 8 is located downstream of the support member 4. The transverse air supply member 10 has a curved upper surface (see FIG. 2) defining a row 12 of openings 14 which are equally spaced from one another. Three spaced guide rails 16, 18 and 20 extending parallel to the side walls 6 and 8, are supported by the transversely extending members 4 and 10. These three guide rails define a guide path for a seed tray from the right hand end of the apparatus as viewed in FIG. 1, over the support member 4 and right up to the air supply member 10. The three rails 16, 18 and 20 are supported in such a way that they define a path which changes from a planar path at the right hand end of the apparatus (as viewed in FIG. 1) to a convex curved path conforming to the curvature of the upper surface of the member 10 at the point where it meets the member 10. Three further guide rails 17, 19 and 21 are provided to define the seed tray path downstream of the member 10.

Figure 2:
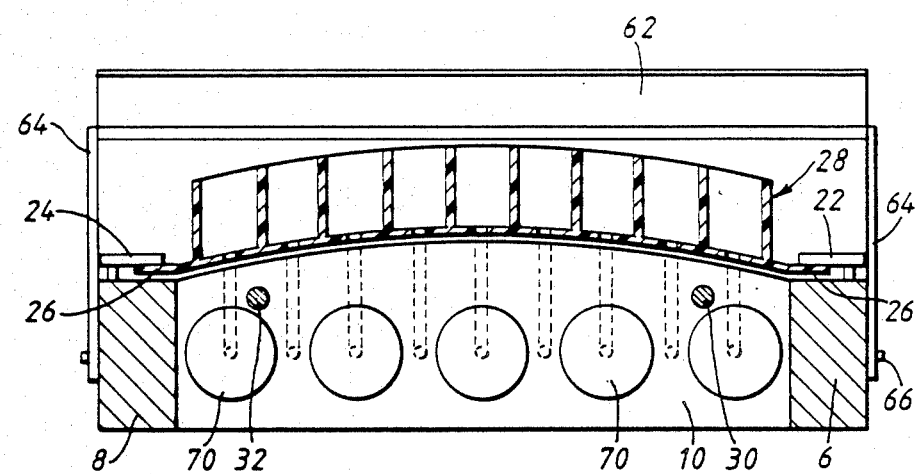
FIG. 2 is a section of FIG. 1 taken along line II—II to an enlarged scale.

As viewed in FIG. 2 (but omitted from FIG. 1) a pair of guides 22 and 24 are mounted on respective ones of the walls 6 and 8 but spaced above the walls 6 and 8 to define a pair of guide channels to receive the side flanges 25 of a seed tray 28. With this arrangement a seed tray being displaced along the path defined by the guide rails 16 to 20 will start with a planar configuration as it passes over the transverse member 4 but due to the constraining action of the guide channels will be forced to adopt a convex configuration as it passes over the air supply member 10 so as to conform the base as closely as possible to the upper curved surface of the member 10.

A pair of reciprocable rods 30 and 32 are slidably supported by the two members 4 and 10. The two rods 30 and 32 are rigidly coupled together by an "H"-shaped bracket 34. A piston and cylinder arrangement 36 (see FIG. 3) has a cylinder 38 secured to the support member 4 and piston 40 coupled to the underside of the "H"-shaped bracket 34. A coil spring 42 coupled between the "H"-shaped bracket 34 and the support member 4 urges the "H"-shaped bracket 34 and therefore the rods 30 and 32 to the right hand side as viewed in FIG. 3. Operation of the cylinder and piston arrangement 36 causes the "H"-shaped bracket 34 and therefore the rods 30 and 32 to reciprocate in the direction of the path. Each rod 30 and 32 carries two respective pairs of drive assemblies 44 and 46, one pair of drive assemblies on each rod being located upstream of the member 10 and the other pair being located downstream.

Figure 3:
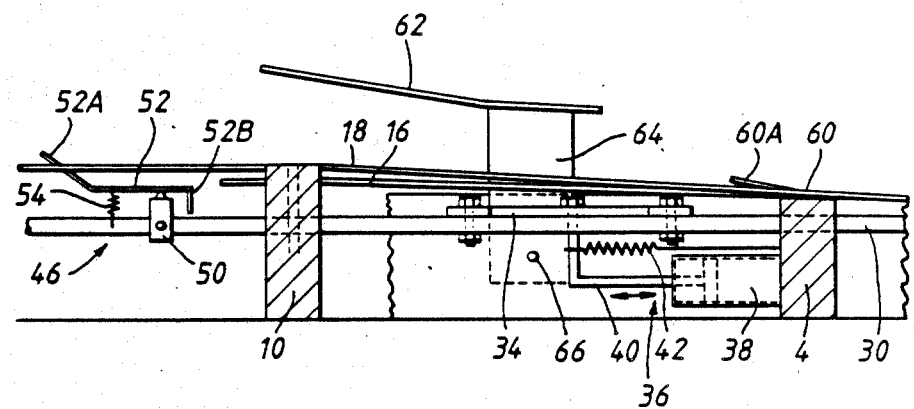
FIG. 3 is a longitudinal section of the apparatus of FIG. 1.

All eight drive assemblies are similar in construction and only one assembly is shown in some detail in FIG. 3. As shown in FIG. 3 the assembly 46 includes a pivot 50 rigidly secured to the rod 30. The pivot 50 carries a lever 52 which extends in the same longitudinal direction as the rod 30. The assembly generally lies below the path of travel of the seed trays but the downstream end 52A of the lever 52 is angled upwardly to project slightly above the level of the path so that it can engage the underside of a passing seed tray. A coiled spring 54 mounted on the rod 32 urges the angled part of the lever 52 into contact with the seed tray. The part 52B of the lever 52 downstream of the pivot 50 is angled downwardly (preferably at a right angle) so that when the lever is pivoted by the spring 54 in a clockwise sense, the clockwise movement of the lever 52 is limited when the part 52B engages with rod 30. Thus the extent to which the part 52A extends above the surface of the path is limited by the part 52B engaging the rod 30. The part 52A can be urged downwardly out of the way of the path against the force of the compression spring 54 by the underside of a seed tray.

A pair of spring fingers 60 are mounted on the support member 4 on opposite sides of the guide rail 18. Each finger 60 (only one shown) extends in the direction of the path and has its downstream end 60A angled upwardly to extend above the path. The resilience of the finger 60 enables the downstream end 60A to be urged downwardly below the level of the path.

In operation when the rods 30 and 32 are caused to reciprocate by the piston and cylinder member 36 acting through the "H"-shaped bracket 32 and in the presence of a seed tray resting on the guide rails, the parts 52A of the drive assemblies 44 and 46 engage the underside of the seed tray and during the forward stroke of the rods 30 and 32 step the tray in the downstream direction. During the return stroke of the rods 30 and 32 the spring fingers 60 engage the underside of the tray and prevent the tray from moving in the upstream direction. As the assemblies 44 and 46 move upstream, the levers 52 pivot in an anticlockwise sense to clear the underside of the seed trays. During the next forward stroke of the rods 30 and 32 the sequence is repeated.

It will be appreciated that the underside of the seed tray may be planar or provided with depressions between the individual compartments. The ability of the lever 52 and the fingers 60 to retract below the path allows the tray to clear both the lever 52 and the fingers 60 during the appropriate stroke without fouling the tray.

As shown in FIGS. 2 and 3 (but omitted from FIG. 1) a transverse shield member 62 is provided. The shield member 62 is pivotally supported on opposite side walls 6 and 8 by a pair of side plates 64 through respective pivots 66. The downstream portion of the shield plate is angled upwardly and extends over and beyond the row of openings in the air supply member 10. The shield member 62 can be pivoted about its pivots 66 from the operational position shown in FIG. 3 in a clockwise sense into a non-operational position to provide clear access to the row 12 of openings 14.

The air supply member 10 carries four air cylinders 70 on one side and five air cylinders 70 on the other side in staggered relationship to each other. Each air cylinder is arranged to store a metered quantity of air and communicates with a respective one of the nine openings 14 through a respective passage in the air supply member (see FIG. 2). On a specific command all nine cylinders can be triggered to release the air stored simultaneously, and a bolus of air will be shot out of each opening 14.

Figure 4:
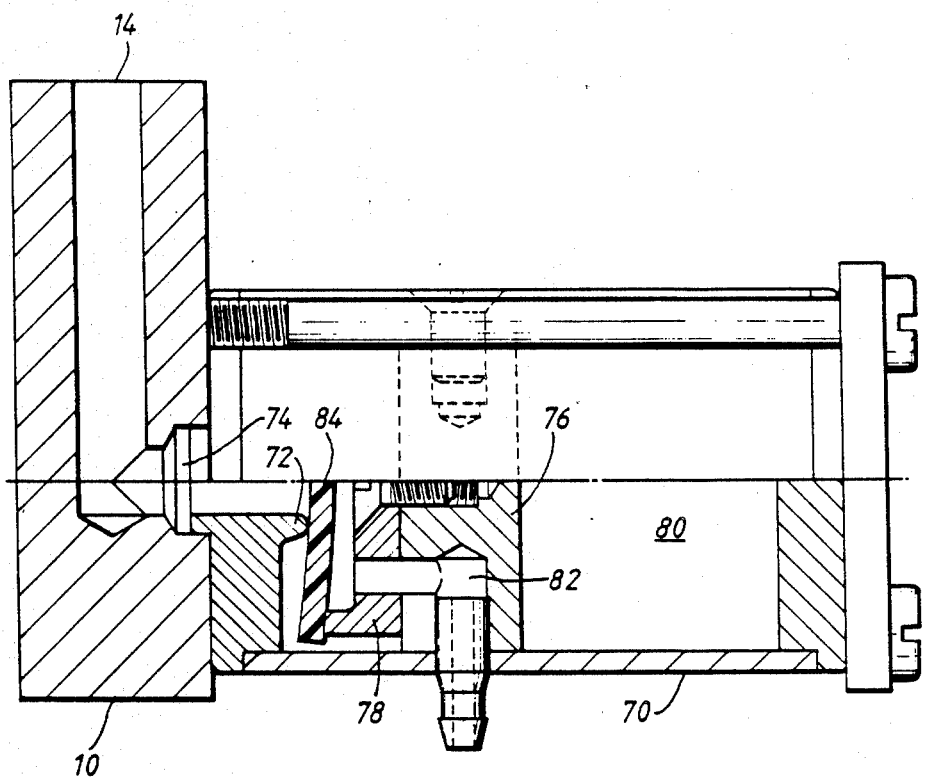
FIG. 4 is a part sectional side elevation of one of the reservoir cylinders of the apparatus of FIG. 1.

Each air cylinder 10 is shown more clearly in FIG. 4. As shown each cylinder defines a chamber 80 closed at one end and provided with a valve seat 72 defining an outlet opening 74 at the opposite end.

A narrow strut 76 extends diagonally of the chamber 80 and supports a cup-shaped member 78 on a side thereof facing the valve seat. An air inlet passage 82 extends through the strut into the cup-shaped member. A flexible circular disk 84 is engaged by the outer circumference of the cup-shaped member 78 and urged against the valve seat 72. In the position shown in FIG. 4 the disc 84 bears against the valve seat 72 to close the outlet opening 74 and also bears against the cup-shaped member 78 to close the inlet passage 82.

In operation when air is forced into the inlet passage it will force the disk away from the cup-shaped member 78 and fill the volume of the chamber (the strut 76 being narrow will not impede the flow of air from one side thereof to the other).

When the supply of air to the passage 82 is discontinued and the passage 82 is instead vented to the atmosphere, the pressure of air within the chamber 80 will act on the disk 84 to urge it into the cup-shaped member 78. As a result the disc 84 will clear the valve seat 72 and the contents of the chamber will be released into the outlet to emerge from a corresponding opening 14 as a bolus of air.

By this means all nine cylinders can be filled and then the air entrained therein released simultaneously.

Figure 5:
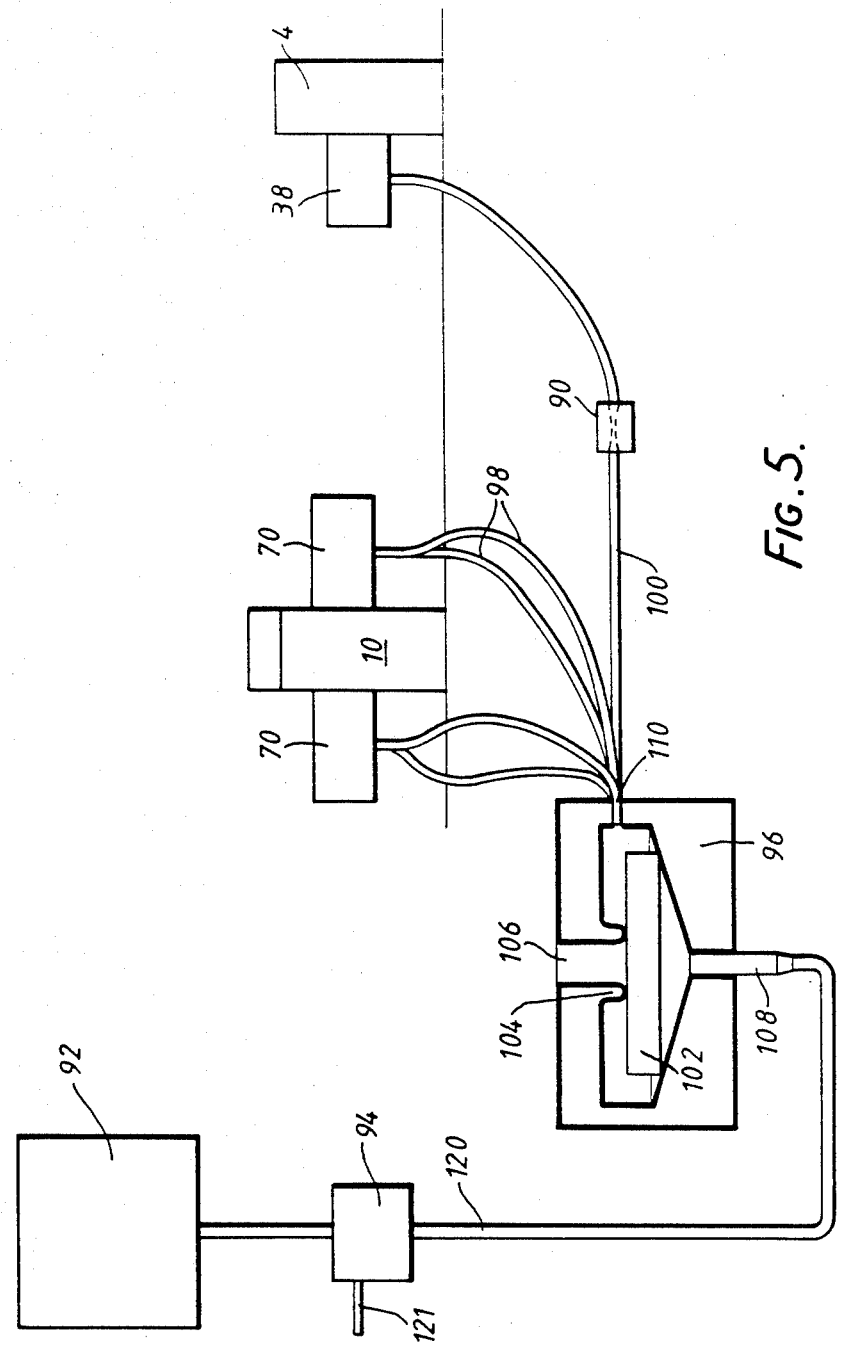
FIG. 5 is a schematic drawing of the pneumatic system of the apparatus of FIG. 1.

The pneumatic control system controlling the apparatus is more clearly shown in FIG. 5.

A compressor 92 supplies air to an automatically operating valve 94 which cyclically connects a hoseline 120 alternately to the compressor 92 and to vent 121 which is vented to the atmosphere. Such a valve is well known and operates under the power of the compressed air supplied, to cyclically reciprocate a valve member controlling the coupling of the hoseline 120 to the vent 121 and to the compressor 92.

The hoseline 120 is coupled to the inlet 108 of a valve assembly 96. The valve assembly 96 has an annular valve seat 104 surrounding a wide outlet vent 106 and a plurality of outlet couplings 110 feeding hoses 98 to respective cylinders 70 and also a hose 100 coupled to the cylinder 38 of the piston and cylinder assembly 36, via a restrictor 90.

Inside the valve assembly 96 is a flexible disc 104 which, in the state shown in FIG. 5, blocks both the vent 106 and inlet 108.

In operation, when air is supplied to the inlet 108 under pressure, the air pressure forces the outer periphery of the disc 102 away from the inlet and admits air to the couplings 110. Each cylinder 70 is filled with air and the air also passes into the cylinder 38 of the piston and cylinder arrangement 36. The piston 40 thereupon displaces the rods 30 and 32 to perform a forward stroke. The drive assemblies 44 and 46 on the rods 30 and 32 step a seed tray located on the path, in the downstream direction to bring the first row of compartments into register with the row 12 of openings 14 in the member 10.

At this point the valve 94 vents the hoseline 120 to atmosphere. The pressure of air in the valve assembly 96 urges the periphery of the disc to close the inlet 108 and to become concave. This causes the disc 102 to clear the valve seat 104 and thereby to vent all the outlet couplings to the large outlet vent 106.

This in turn vents each of the cylinders 70 simultaneously and a bolus of air emerges from each opening 14 into the drainage hole in the base of each of the aligned compartments in the seed tray. This action physically lifts each plug of soil out of the compartment. Because the bolus of air dissipates very quickly around the plug upon release there is no sustained force on the plug and so it very quickly drops back into its compartment. Where the plug of soil is loose in the first instance it may travel further than the other plugs but the overlying shield quickly limits the height to which the plug will be displaced.

Meanwhile the air is also released from the cylinder 38 relatively slowly through the restrictor 90. The spring 42 will then act to perform the return stoke of the rods 30 and 32 and the apparatus is then ready for the next cycle.

It will be thus appreciated that when the apparatus is operating continuously, seed trays will be stepped in quick succession along the path to bring each row of compartments into alignment with the row of holes in the member 10, a bolus of air will then be injected into each compartment through the hole in the base, and the plug of soil in that compartment will be freed from the side walls, as it is temporarily lifted from its compartment by the bolus of air.

Where a plug containing a seedling strikes the shield very little damage is done to the seedling because the air pressure is not a sustained one and the plug itself (being of potting compost) is lightweight.

The curvature of the air supply member 10 and the holding down of the sides of the seed tray assists in ensuring close contact between the underside of the seed tray and the face of the member 10 to ensure that each bolus of air is constrained to enter a respective compartment and is not partially dissipated beforehand.

The speed at which the apparatus operates, is controlled by the speed at which the valve 94 operates; both the cylinders 70 and the piston and cylinder arrangement 36 operating in synchronism.

Where seed trays having different numbers of compartments per row are used, the air supply member 10 can be replaced by another with an appropriate number of openings 14 and carrying an appropriate number of cylinders 70.

The stroke of the rods 30 and 32 and the piston 40 can be regulated by providing appropriate stops (not shown) mounted on the support 2 to define the limits of the forward and return strokes.

While a presently preferred embodiment of the present invention has been illustrated and described, modifications and variations thereof will be apparent to those skilled in the art given the teachings herein, and it is intended that all such modification and variations be encompassed within the scope of the appended claims.

I claim:

1. Soil plug release apparatus for releasing plugs of soil from an array of compartments arranged in rows and columns in a tray, each compartment having a hole in the base thereof, the apparatus comprising
   a support structure,
   guide means mounted on the support structure for guiding the tray along a predetermined path,
   means mounted on the support structure and defining a line of openings extending transversely of said path with the openings being spaced at the same intervals as the holes in each row of compartments, the opening defining means having a surface defining the exit for the openings which surface is curved in a plane containing the axes of said openings and wherein said path changes from a planar path to a curved one to match the curvature of said surface where said surface traverses said path,
   means mounted on the support structure for displacing said tray along said path to bring each row of holes in turn into alignment with the line of openings,
   guide members mounted on the support structure for engaging the sides of said tray as it approaches said surface to force said tray to conform to the curvature of said surface whereby to ensure close contact between the base of the tray and said surface at the position where the tray passes over said surface, and
   means coupled to the means defining the openings for discharging a discrete predetermined bolus of fluid through each opening to release the plugs from the compartments corresponding to the aligned row of holes.

2. Apparatus according to claim 1 wherein the fluid discharging means comprises a plurality of discrete reservoir cylinders, one for each opening and means coupled to the reservoir cylinders to periodically refill them with air.

3. Apparatus according to claim 1 including a shield mounted on said support structure above the line of openings to limit the travel of each plug. when ejected from its compartment by the discrete predetermined bolus of fluid.

4. Apparatus according to claim 1 wherein the means for stepping said tray along said path comprises
   a pair of elongate drive members slidably supported by the support structure,
   a plurality of engagement members supported by the drive members for engaging the underside of the tray, and means mounted on the support structure for reciprocating said elongate drive members.

5. Apparatus according to claim 4 including engagement members mounted on the support structure for engaging the underside of the tray, said further engagement members being so profiled as to prevent the displacement of the tray along said path in the upstream sense during the return stroke of the elongate members.

6. Apparatus according to claim 2 wherein each said reservoir cylinder comprises a device which has an inlet for receiving air, an outlet for discharging air through a corresponding one of said openings, and valve means within the cylinder operable when air is supplied through said inlet to admit air into the cylinder and to close the outlet and operable when the inlet is vented to the atmosphere, to close the inlet and open the outlet to release the air stored therein.

7. Apparatus according to claim 2 wherein the support structure defines a pair of spaced lateral supports, and wherein said opening defining means comprises a bridge member bridging said two supports, said bridge member having curved upper surface defining said openings.

8. Apparatus according to claim 7 wherein said reservoir cylinders are mounted on opposite flanks of said bridge member, and said bridge member defines a plurality of channels for providing a fluid coupling between each reservoir and its corresponding opening.

9. Apparatus according to claim 8 wherein said reservoir cylinders are mounted on the bridge member with their axes being parallel to one another and lying in a common plane, each alternate axis in the plane belonging to a cylinder mounted on one flank of the bridge member and each intervening axis belonging to a cylinder mounted on the opposite flank of the cylinder.

10. Apparatus according to claim 1 including sensing means for sensing when a row of holes in a said tray becomes aligned with said openings and means for actuating said discharge means to release the discrete predetermined bolus of fluid to the openings in response to alignment being sensed by the sensing means.

11. Soil plug release apparatus for releasing plugs of soil from an array of comparments arranged in rows and columns in a tray, each compartment having a hole in the base thereof, the apparatus comprising:

a pair of support members held in parallel spaced relationship, a bridge member spanning said support members and having a curved upper surface, the curvature being in a vertical plane, and the upper surface defining a row of spaced openings having axes which also lie in a common vertical plane, the spacing between the openings corresponding to the spacing of the holes in a row of tray compartments, guide means mounted on said support member, for guiding a said tray between the support members and transversely over the upper surface of the bridge, the guide means being so profiled as to deform the underside of the tray to conform to the curvature of the bridge member at the point the tray passes over the bridge member, a plurality of cylinders each arranged to store a discrete bolus of air, means coupling each cylinder to a corresponding said opening, means for sensing when a row of holes in a tray become aligned with the openings in the bridge member, means for releasing the bolus of air from each cylinder to corresponding openings in response to the sensing means sensing a said alignment, and means for recharging each cylinder with a bolus of air.

* * * * *